(12) United States Patent
Yamato

(10) Patent No.: US 6,528,154 B1
(45) Date of Patent: Mar. 4, 2003

(54) MAKEUP SPONGE PUFF

(75) Inventor: Yuichi Yamato, Hiroshima (JP)

(73) Assignee: Nishikawa Rubber Co., Ltd., Hiroshima (JP)

( * ) Notice: Subject to any disclaimer, the term of this patent is extended or adjusted under 35 U.S.C. 154(b) by 1116 days.

(21) Appl. No.: 08/680,325

(22) Filed: Jul. 12, 1996

(51) Int. Cl.[7] .............................. B32B 5/22
(52) U.S. Cl. .................. 428/317.9; 428/64.1; 428/147; 428/206; 428/306.6; 428/314.4; 428/317.1; 428/322.7; 428/327; 206/823; 401/54; 401/200; 401/261
(58) Field of Search ........................ 206/823; 401/54, 401/200, 261; 428/64.1, 147, 206, 306.6, 314.4, 317.1, 317.9, 322.7, 327; D28/4, 7

(56) References Cited

U.S. PATENT DOCUMENTS 4,461,099 A * 7/1984 Bailly ........................ 36/44
4,464,428 A * 8/1984 Ebert et al. .................. 428/95
4,828,542 A * 5/1989 Hermann ..................... 604/3
5,434,194 A * 7/1995 Fujimoto et al. ........... 521/134

* cited by examiner

Primary Examiner—Terrel Morris
Assistant Examiner—Hai Vo
(74) Attorney, Agent, or Firm—Flynn, Thiel, Boutell & Tanis, P.C.

(57) ABSTRACT

To provide a makeup sponge puff of less frictional resistance and stiffness and no surface slipperiness, particles are adhered to a surface of a substrate sponge of closed-cell foam to form the makeup sponge puff. For example, the substrate sponge comprising is a natural or synthetic rubber, the particles are a thermoplastic resin, synthetic rubber or a thermosetting resin, and the particles are adhered by an adhesive layer on the surface of the substrate sponge.

4 Claims, 1 Drawing Sheet

MAKEUP SPONGE PUFF

BACKGROUND OF THE INVENTION

1. Field of the Invention

This invention relates to a makeup sponge puff used for applying makeup beauty products, such as a foundation in particular, and a method for preparing the same.

2. Prior Art

A polyurethane foam and a rubber foam have been conventionally used for applying makeup beauty products. The reason why is that these foams feel soft because of adequate their elasticity. On the other hand, it has been a problem that the foams awkwardly slither on and are caught by the skin due to the distortion thereof caused by their elasticity.

Although a sponge puff made of a closed-cell foam has recently been for applying liquid type beauty products and has characteristics such excessive liquid beauty products are impermeable therein, there are still many users who dislike using such a puff. Since the sponge puff of closed-cell foam does not and absorb any of the beauty products, a "playing" condition of the beauty products occurs between the skin and the sponge puff, which causes the sponge puff to slip on the skin or causes an unexpected feeling of stiffness when the beauty products are no longer applied on the skin. This is the reason why the sponge puff of closed-cell foam is unpopular among the users.

Accordingly, it is an object of the present invention to provide a makeup sponge puff so that conventional problems as described above, such as poor slip characteristics, a dragging feeling or stiffness of the makeup sponge puff on the skin, are solved.

SUMMARY OF THE INVENTION

According to a first embodiment of the present invention, there is provided a makeup sponge puff in which particles 15 are adhered to a surface 11 of a substrate sponge 10 of closed-cell foam.

According to a second embodiment of the present invention, there is provided a makeup sponge puff in which the particles 15 comprising a thermoplastic resin, synthetic rubber or a thermosetting resin are adhered to the surface 11 of the substrate sponge 10 comprising a natural or synthetic rubber sponge by an applied adhesive layer or through an adhesive action such as direct thermal fusion and co-crosslinking.

According to a third embodiment of the present invention, there is provided a makeup sponge puff in which the particles 15 comprising a thermoplastic resin, synthetic rubber or a thermosetting resin are glued on the surface 11 of a sponge substrate 10 comprising a synthetic resin sponge by the applied adhesive layer or through an adhesive action such as direct thermal fusion and co-crosslinking.

According to a fourth embodiment of the present invention, there is provided a makeup sponge puff in which, in addition to construction of the first embodiment, the substrate sponge 10 comprises NBR, silicone modified EPDM or EPDM and the particles 15 comprise a polyolefin resin.

DESCRIPTION OF THE PREFERRED EMBODIMENT

Figure 1:
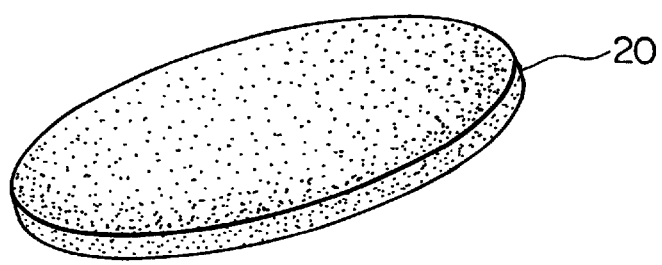
FIG. 1 is a perspective view of a makeup sponge puff.
Figure 2:
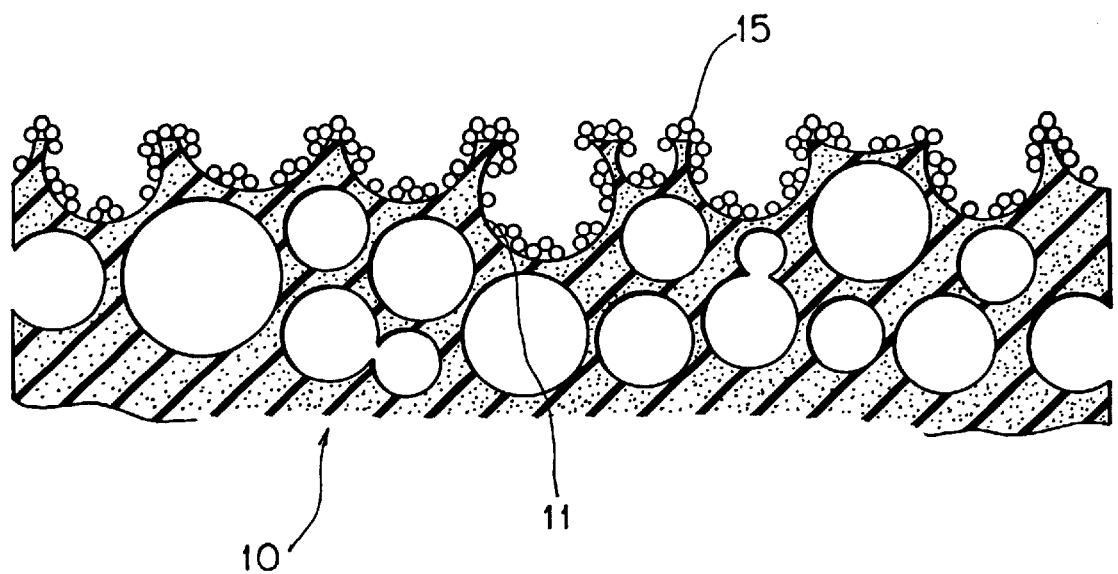
FIG. 2 is a sectional view showing an embodiment of the present invention.

Embodiments of the present invention will be described in the following with reference to FIGS. 1 and 2. In order to prepare a makeup sponge puff of the present invention, particles 15 comprising a thermoplastic resin, synthetic rubber or a thermosetting resin are discontinuously adherd to a surface 11 of a substrate sponge 10 of closed-cell foam so as not to occupy all of the surface 11, by forming an adhesive layer or through an adhesive treatment such as direct thermal fusion and co-crosslinking, and also by a treatment such as heating, drying, etc., and thereafter blanking is applied, if necessary.

More detailedly, a sponge puff substrate includes various kinds of sponge rubber such as acrylonitrile-butadiene rubber (NBR), styrene-butadiene rubber (SBR), natural rubber (NR), silicone rubber (Q) and the like, and a synthetic resin foam such as polyethylene, vinyl acetateethylene copolymer and the like.

A component of the particles to be adhered to the surface of the sponge puff substrate includes powder of various kinds of rubber acrylonitrile-butadiene rubber (NBR), styrene-butadiene rubber (SBR), natural rubber (NR), silicone rubber (Q) and the like similarly as described above, powder of a synthetic resin such as a polyurethane, polyamide, polyethylene, polypropylene, polyvinyl chloride, polyvinyl alcohol, vinyl acetate-ethylene copolymer, a silicone resin and the like, and powder of an organic, mineral or inorganic material such as walnut powder, or a combination thereof, depending on their compatibility with the substrate sponge or their adaptability to the adhesive layer to be sandwiched.

A polyolefin resin used in the present invention includes a polyethylene resin, a polypropylene resin, and a resin of ultra high molecular weight type such as an ultra high molecular weight polyethylene having a molecular weight more than a million.

The particle size of the particles is preferably several $\mu$m to several hundreds $\mu$m. A hardening agent, a curing agent etc. which are co-curable with the substrate sponge, can be previously added to the particles, thereby giving an adhesive strength without an adhesive layer. All of these agents should be selected with due regard to the health of the user's skin.

First Embodiment

A sheet of EPDM closed-cell sponge sheet as a substrate sponge 10 was coated homogeneously with powder of an ultra high molecular weight polyolefin having an average particle size of 20 $\mu$m (trade name Miperon XM-220; available from Mitsui Petrochemical Industries, Ltd.), and treated in an oven at 140°C. for three minutes to partially melt and adhere the powder to the substrate sponge 10 by thermal fusing. The substrate with the powder thus treated was then blanked to form a sponge puff 20.

Second Embodiment

A sheet of EPDM sponge as the substrate sponge 10 was blanked to form a sponge puff 20, which was then coated homogeneously as a whole with powder of an ultra high molecular weight polyolefin having an average particle size of 20 $\mu$m (trade name Miperon XM-220; available from Mitsui Petrochemical Industries, Ltd.), and treated in an oven at 140° C. for three minutes to partially melt and adhere the powder to the substrate sponge 10 by thermal fusing so as to complete the sponge puff.

Third Embodiment

A sheet of silicone rubber sponge as the substrate sponge 10 was coated with a binder (trade name BY 22-826; available from Dow Corning Toray Silicone Co., Ltd.) and then with a silicone resin (trade name Tospearl 145; available from Toshiba Silicone Co., Ltd.; average particle size is 4.5 $\mu$m) homogeneously, dried and blanked to form a sponge puff 20.

The contact surface between the skin and the sponge puff 20 is decreased by virtue of the sponge puff 20 of the present invention. For example, when the frictional coefficient of the sponge puff prepared by the first embodiment was determined by means of a frictional feeling tester, KES-SE available from Kato Tech Co., Ltd., under a condition of 50 g loading and a testing rate of 1 mm/sec, the frictional resistance coefficient of the surface treated sponge puff of the present invention was 1.00, thereby eliminating the feeling of stiffness, while that of a conventional sponge puff was 3.26.

Liquid beauty products can be absorbed in the gaps between each particle 15 formed on the surface of the sponge puff 20, thereby decreasing the feelings of surface slipperiness as well as stiffness unexpectedly occurring when the beauty products are no longer applied.

When the surface of conventional foams is coated with a resin film, etc., continuously and homogeneously, advantages thereof such as characteristic elasticity of the substrate sponge, a comfortable feel due to the pore size and the like are often lost. In the case of the sponge puff 20 of the present invention, due to the advantages of the substrate sponge 10, and also because the beauty products can be absorbed in the closed-cell puff, unlike conventional ones, makeup characteristics are improved.

As has been described above, the contact area between the skin and the sponge puff 20 can be decreased by the present invention, thereby lowering the frictional resistance and causing less feelings of stiffness. Further, as the liquid beauty products can be absorbed in gaps between each particle 15 formed on the surface of the sponge puff 20, it is possible to reduce feelings of surface slipperiness as well as stiffness which unexpectedly occurring when the applied beauty products run out, or are removed.

What is claimed is:

1. A makeup sponge puff comprising a closed-cell foam sponge substrate made of natural sponge or a synthetic rubber material and having an exterior surface with a plurality of cavities formed therein, an adhesive layer provided on the exterior surface of the closed-cell foam sponge substrate and a plurality of particles discontinuously adhered to the adhesive layer on the exterior surface of said closed-cell foam sponge substrate including said cavities.

2. The makeup sponge puff of claim 1, wherein said particles are selected from the group consisting of a thermoplastic resin, a synthetic rubber and a thermosetting resin.

3. A makeup sponge puff comprising a closed-cell foam sponge substrate made of natural sponge or a synthetic rubber material and having an exterior surface with a plurality of cavities formed therein and a plurality of particles discontinuously adhered to the exterior surface of said closed-cell foam sponge substrate including said cavities through crosslinking.

4. The makeup sponge puff of claim 3, wherein said particles are selected from the group consisting of a thermoplastic resin, a synthetic rubber and a thermosetting resin.

* * * * *